Dec. 10, 1957    NORMAN CHEN-HU CH'IN ET AL    2,816,145
METHYL MERCAPTAN PROCESS
Filed Aug. 18, 1952
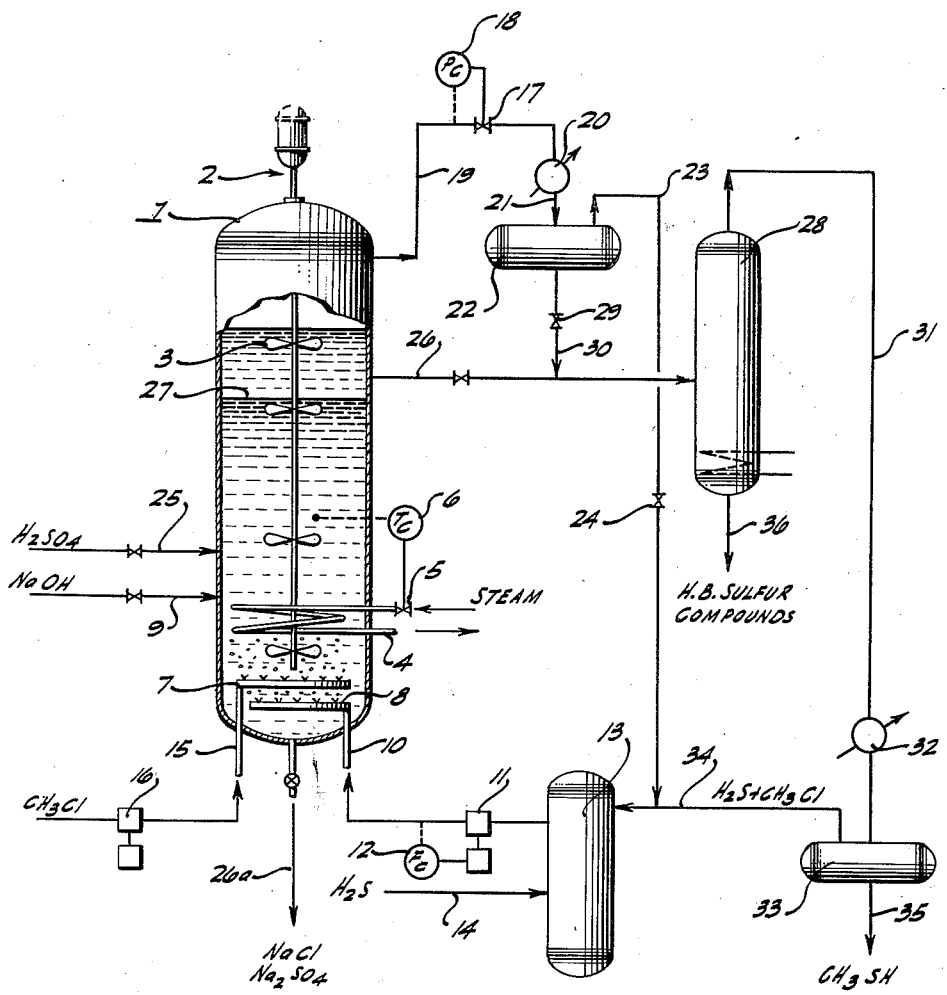
INVENTORS.
NORMAN CHEN-HU CH'IN,
CARLETON B. SCOTT,
BY Ross J. Garofalo
ATTORNEY.

United States Patent Office 2,816,145
Patented Dec. 10, 1957

2,816,145

METHYL MERCAPTAN PROCESS

Norman Chen-Hu Ch'in, Los Angeles, and Carleton B. Scott, Pomona, Calif., assignors to Union Oil Company of California, Los Angeles, Calif., a corporation of California Application August 18, 1952, Serial No. 305,036

8 Claims. (Cl. 260—609)

This invention relates to a new process for the manufacture of methyl mercaptan. More specifically it is a method designed for utilizing as raw materials methyl chloride, hydrogen sulfide and a metal hydrosulfide, and is conducted in the liquid phase in the presence of water as the sole solvent. The basic reaction is as follows:

$$CH_3Cl + ZSH \rightarrow CH_3SH + ZCl \qquad (1)$$

where Z is an alkali or alkaline earth metal.

Methyl mercaptan has recently become a material of considerable commercial interest, primarily because of its use in the synthesis of amino acids such as methionine.

While the general reaction of alkyl halides with metal hydrosulfides to produce mercaptans is well known, previous methods have been conducted under anhydrous conditions, and usually in the absence of free hydrogen sulfide. Considering more specifically methyl mercaptan, previous methods have employed dimethyl sulfate, methyl iodide or methyl bromide exclusively, as the alkylating agents, methyl chloride being correctly considered much less reactive than the sulfate, iodide, or bromide under the reaction conditions heretofore employed. By the methods disclosed herein, commercially practicable reaction rates and yields are obtained employing the much cheaper methyl chloride as the alkylating agent. The conditions described herein also reduce to a minimum the undesirable side reactions which are found to accompany the mercaptan reaction shown in Formula 1. Some of these side reactions are as follows:

$$CH_3SH + NaSH \rightleftarrows CH_3SNa + H_2S \qquad (2)$$

$$CH_3SNa + CH_3Cl \longrightarrow CH_3SCH_3 + NaCl \qquad (3)$$

$$2NaSH \rightleftarrows Na_2S + H_2S \qquad (4)$$

$$2CH_3Cl + Na_2S \longrightarrow CH_3SCH_3 + 2NaCl \qquad (5)$$

$$2CH_3SH \xrightarrow{(O)} CH_3SSCH_3 + H_2O \qquad (6)$$

Manifestly, if the reactions shown in Equations 3 and 5 are allowed to proceed, dimethyl sulfide, $CH_3SCH_3$, will be produced at the expense of methyl mercaptan. It is clear also that Equations 3 and 5 cannot proceed forward if Equations 2 and 4 are effectively repressed. It has now been found that these latter reactions can be effectively repressed by maintaining an excess of hydrogen sulfide in the reaction zone. Also it has been found that Reaction No. 6 resulting in the formation of dimethyl disulfide is effectively repressed by the reducing atmosphere provided by the excess of hydrogen sulfide. The use of an excess of hydrogen sulfide for repressing undesirable side reactions has not always been considered necessary in the past, due partly perhaps to the relatively rapid rate of reaction for Equation 1 which is obtained with methyl bromide or dimethyl sulfate for example.

However, it has been found, quite unexpectedly, that the yield of methyl mercaptan is unfavorably affected if too large an excess of hydrogen sulfide is present. It is therefore desirable to exercise control over the quantity of hydrogen sulfide present in the reaction mixture at any given time.

In the anhydrous state, or in the presence of solvents such as alcohols which have a relatively low dielectric constant, the reaction of methyl chloride with sodium hydrosulfide to produce methyl mercaptan is extremely slow, much slower than when water is used as the solvent. The reaction under anhydrous conditions, or with alcoholic solvents, may be accelerated to some extent by operating at high pressures and high temperatures, but such measures require expensive pressure vessels and greatly increase corrosion problems. It has now been found that commercially satisfactory reaction rates may be obtained with methyl chloride by conducting the reaction in an aqueous liquid phase with no organic solvents, and at moderate temperatures and pressures, thereby avoiding the use of high-pressure equipment and minimizing corrosion. The use of an aqueous medium is particularly advantageous when using methyl chloride, as compared to methyl bromide for example, because methyl chloride is about ten times as soluble in water as methyl bromide. The use of water is therefore not feasible in the case of methyl bromide because the sodium hydrosulfide concentrates almost exclusively in the aqueous phase, apart from the methyl bromide, and the reaction rate is hence limited by interphase diffusion rates. However, in the case of methyl chloride as utilized herein, a significant quantity thereof is always dissolved in the aqueous hydrosulfide phase, and the reaction rate is hence not determined by interphase diffusion rates, and at the same time is accelerated by the highly polar nature of the solvent. Moreover the methyl mercaptan, being insoluble in water tends to separate into an organic phase as it is formed, and thereby further inhibits Reaction 2 above, since the sodium hydrosulfide remains largely in the aqueous phase.

In view of the above it will be seen that the broad objective of the invention is to provide an economical method for producing methyl mercaptan from the inexpensive raw materials hydrogen sulfide, caustic, and methyl chloride.

A more specific object is to provide means and methods for accelerating the reaction of methyl chloride and sodium hydrosulfide.

Still another object is to provide optimum reaction conditions whereby maximum yields of methyl mercaptan are obtained and undesirable side-reactions are minimized.

Another object is to avoid the use of expensive, high-pressure equipment and to reduce corrosion of the equipment employed.

Other objects will be apparent from the more detailed description which follows, and still others will be obvious to those skilled in the art.

The invention may be practiced in either a batchwise or continuous manner. The attached drawing illustrates a suitable arrangement of apparatus for batchwise operation. Referring more particularly to the drawing, the numeral 1 designates the reaction vessel which is constructed of corrosion resistant alloys such as stainless steel or monel metal, and is designed to withstand pressures up to about 100 to 300 p. s. i. g. or higher. The vessel is equipped with a stirring device 2 containing a plurality of agitator vanes 3. A coil 4 or other heating and cooling device is provided, preferably in the lower part of the reactor. Steam or water is admitted through valve 5 which is controlled by temperature controller 6 from a point within the reaction vessel 1. In the lower section of reaction vessel 1 is provided a gas distributing ring 7 for introducing methyl chloride into the reactor. A similar gas distributing ring 8 is provided for introducing hydrogen sulfide into the reactor. In some cases, the circulation of these gaseous reactants through the reaction zone provides sufficient agitation so that separate mechanical agitation is not necessary.

In a typical batch operation employing the apparatus illustrated, the desired quantity of aqueous sodium hydroxide or other metal hydroxide is first introduced into the reaction vessel through line 9, and hydrogen sulfide is then introduced through line 10 to convert the NaOH to NaHS. The sodium hydroxide is employed in sufficient amount to yield at least a slight stoichiometric excess of sodium hydrosulfide over the amount of methyl chloride to be employed. The strength of the sodium hydrosulfide solution formed is also a highly significant factor herein. It is found that if dilute sodium hydrosulfide solutions are employed, corrosion of equipment is markedly increased and yields are decreased, especially at high temperatures. To provide optimum yields and avoid corrosion problems the sodium hydrosulfide solution should be at least about 4 N in strength and may range as high as 14 N. For most practical purposes it is preferred to employ solutions ranging in strength from about 6 N to 10 N. (Normality, as expressed herein, means the sodium normality of the NaHS solution, and is hence numerically equal to the molarity of the solutions.) Solutions of these respective strengths, when formed by the neutralization of NaOH solutions with hydrogen sulfide are somewhat more dilute than the original NaOH solution due to the formation of water in the reaction:

$$NaOH + H_2S \rightarrow NaHS + H_2O \qquad (7)$$

The total quantity of sodium hydrosulfide formed should be between about 0.8 and 2 molar equivalents of the methyl chloride to be employed, and preferably between about 1 and 1.5 molar equivalents thereof.

After the sodium hydroxide solution has been admitted to the reaction vessel, hydrogen sulfide from storage tank 13 is pumped into the bottom of the reaction vessel 1 through line 10 by means of pump 11. Fresh $H_2S$ is added to storage tank 13 via line 14. Pump 11 is controlled by flow controller 12 in such manner as to admit a constant volume of $H_2S$ to the reaction vessel. The hydrogen sulfide passes into gas-distributor ring 8 and bubbles upwardly through the sodium hydroxide solution. The admission of hydrogen sulfide is continued until the sodium hydroxide is completely converted to sodium hydrosulfide and sufficient excess is present to give a substantial but not excessive partial pressure of $H_2S$ in the reaction vessel, thereby providing a moderate molar excess thereof in the aqueous reaction phase.

When the sodium hydroxide has all been converted to sodium hydrosulfide and a substantial partial pressure of excess $H_2S$ exists in the reaction vessel 1, the temperature controller 6 is set to maintain a constant temperature between about 10° C. and 175° C., and preferably between about 20° C. and 70° C. in the reaction vessel 1. Agitator 2 is then energized, and admission of methyl chloride through line 15 is begun, utilizing a positive displacement pump 16 to force entry of the methyl chloride into the reaction vessel through gas distributing ring 7. The admission of methyl chloride is preferably conducted over a period of time, as for example between 1 and 2 hours in order to facilitate the dissolving of the methyl chloride in the aqueous sodium hydrosulfide solution. The principal reaction which takes place is as follows:

$$CH_3Cl + NaSH \rightarrow CH_3SH + NaCl \qquad (8)$$

This reaction is found to be substantially irreversible and hence proceeds to substantial completion.

The admission of methyl chloride to the reaction vessel is continued until the molar ratio of sodium hydrosulfide to methyl chloride is betweeen about 0.8 and 2, and preferably between about 1 and 1.5. When the methyl chloride has all been added the pump 16 is shut off and the reaction is continued at the desired constant temperature and pressure, with continuous circulation of hydrogen sulfide through the reaction mixture.

A continuous circulation of hydrogen sulfide and methyl chloride is maintained by means of the pump 11 and pressure-controlled outlet valve 17, which is controlled by pressure controller 18. The pump 11 continues to pump a constant volume of $H_2S$ and methyl chloride into the reaction vessel 1. The pressure builds up to a predetermined amount, for example between about 0 to 300 p. s. i. g., and preferably between about 50 to 200 p. s. i. g. at the preferred temperatures. Upon reaching the predetermined pressure level, relief valve 17 is opened whereby gases consisting mainly of hydrogen sulfide and methyl chloride, with smaller proportions of methyl mercaptan and water pass out of the reaction vessel 1 through line 19 and through a heat exchanger 20 to cool the gases to preferably between about 0 to 50° C. The cooled gases and condensed liquids are then passed through line 21 into gas-liquid separator 22 where the condensed liquids, consisting mainly of methyl mercaptan and water are separated by gravity from the gas phase which consists mainly of hydrogen sulfide and methyl chloride. These gases are taken off through line 23 and recycled to the hydrogen sulfide reservoir 13, and thence back into reaction vessel 1. The gas recycle system between valve 17 and valve 24 is preferably maintained at essentially the same pressure as the reaction vessel 1 in order to facilitate the condensation of methyl mercaptan in vessel 22 at temperatures higher than its atmospheric pressure boiling point of 7.6° C. The gas recycle system between valve 24 and pump 11 is preferably maintained at lower pressures. The methyl mercaptan which collects in the bottom of vessel 22, together with small amounts of methyl chloride and water is recovered with the final produce as will be described hereinafter.

It will be noted that by the operation of relief valve 17 and pump 11, the temperature and pressure in reaction vessel 1 may be independently controlled, and any of the operative pressures disclosed herein may be employed with any operative temperature.

The time required for obtaining reasonably complete reaction seldom exceeds about 4 hours, even at room temperatures. In most cases the reaction is reasonably complete, and maximum yields are obtained in from 15 minutes to 2 hours at temperatures between about 20° C. and 70° C. It is desirable to stop the reaction as soon as the maximum yields have been attained, both as a matter of simple economy, and because some of the above side-reactions or others may proceed at a slower rate than the desired Reaction 8, and hence may cause a decrease in yield if the reaction time is unduly prolonged. By employing higher temperatures and/or pressures, the reaction time can be shortened still further, but corrosion problems will generally be increased.

The partial pressure of hydrogen sulfide during the reaction should preferably be between about 0.1 and 0.6 of the total pressure. These pressures, however, would not necessarily be effective without more or less continuous recirculation of the gases through all parts of the aqueous phase, since hydrogen sulfide is of such low solubility in the aqueous phase as to require continuous redissolving thereof in order to maintain the optimum dissolved concentration. The operation of agitator 2 serves to increase the gas liquid interface area. The primary purpose of agitator 2 however is to provide intimate contact of the liquid phases which may be present during the reaction, thereby insuring that the aqueous phase is at all times saturated with methyl chloride and hydrogen sulfide at the reaction temperature.

In another modification of the invention, the methyl chloride need not be separately added to the sodium hydrosulfide solution at the beginning of the reaction, but may be continuously metered into the recycle stream of hydrogen sulfide in line 10. In this case the gases removed through line 19 will simply be lean in methyl chloride, and the gases entering line 10 will be rich in methyl chloride. When the concentration of methyl chloride in the effluent gas from line 19 begins to build up to a high level, this will serve as an indication of the completeness of the reaction.

Upon completion of the reaction it will be found that the mixture in the reaction vessel consists of an organic phase which is mainly methyl mercaptan, and an aqueous phase containing mainly sodium chloride with small amounts of sodium mercaptide, sodium sulfide, and excess sodium hydrosulfide. To recover the methyl mercaptan the preferred procedure is to admit sufficient acid such as dilute sulfuric or hydrochloric acid through line 25 to neutralize all these sulfur containing salts, thereby forming methyl mercaptan, hydrogen sulfide and sodium sulfate or sodium chloride. Heating and agitation is preferably continued during the addition of acid to accelerate the reaction. After neutralization is complete the contents of the reactor are then preferably cooled, as for example by admitting cooling water or other refrigerant through the steam coil 4. After cooling the mixture to the desired extent, for example to about 10°–40° C., the agitator 2 is stopped. Cooling the reaction mixture favors the separation of the liquid phases, the crude methyl mercaptan forming a supernatant organic phase. The crude methyl mercaptan is then withdrawn through line 26, and additional water may be added through line 25 in order to raise the water-mercaptan interface 27 to the level of line 26, whereby all the crude mercaptan may be removed.

After the crude methyl mercaptan is removed from the reaction vessel 1 the remaining aqueous solution, containing principally sodium chloride and possibly sodium sulfate, is withdrawn through line 26a and discarded. If the solution is to be emptied into a sewer line, it should preferably be boiled before discharging in order to drive off dissolved $H_2S$.

The crude mercaptan in line 26 is then passed to a distillation column 28. Valve 29 is also preferably opened, thereby permitting condensed mercaptan in vessel 22 to flow through line 30 and into distillation column 28 along with the crude mercaptan from the reaction vessel. The relative amounts of mercaptan removed from vessels 1 and 22 may vary considerably; in some cases nearly all the mercaptan may be collected in vessel 22, depending upon the temperature and gas-circulation rates in vessel 1. The process may in fact be operated so as to continuously remove mercaptan as formed and condense it in vessel 22, thereby further inhibiting side-reaction 2.

Upon distillation of the crude mercaptan mixture an overhead is obtained consisting primarily of methyl mercaptan, methyl chloride and hydrogen sulfide. This overhead is taken off through line 31, partially condensed in condenser 32 and passed into gas-liquid separator 33. The gaseous phase from separator 33 consists primarily of hydrogen sulfide and methyl chloride which is cycled through line 34 to storage vessel 13 for reuse in the next cycle of the process. Purified, liquid methyl mercaptan is withdrawn from vessel 33 through line 35.

The bottoms from distillation column 28 is withdrawn through line 36, and consists primarily of high boiling sulfur compounds such as dimethyl sulfide and water. This mixture may be utilized in any desired manner as for example for generating sulfur dioxide in a waste fuel burner.

EXAMPLE I

In a typical operation utilizing the above-described equipment 11,450 pounds of 50 weight percent sodium hydroxide solution is admitted to the reactor 1. About 5100 pounds of gaseous hydrogen sulfide is then pressured into the reactor by means of pump 11. This provides sufficient hydrogen sulfide to completely react with the sodium hydroxide to form sodium hydrosulfide, and to provide an excess thereof. Agitation is begun, and about 6520 pounds of methyl chloride is then pressured gradually into the reactor by means of pump 16 over a period of about one hour. The temperature of the reaction mixture is maintained at about 50° C. The pressure relief valve 17 is set to maintain a pressure of about 150 p. s. i. g. in the reaction vessel. Pump 11 continues to admit the recycled gases at the rate of about 100 S. C. F. per minute. The initial partial pressure of hydrogen sulfide in the reaction vessel is about equal to that of the methyl chloride, and hence the recycle gas is about 50 mole percent hydrogen sulfide and 50 mole percent methyl chloride. The reaction is continued with agitation for about 1.5 hours. Upon completion, about 442 pounds of commercial sulfuric acid is added to the reactor so as to convert all the remaining sodium hydrosulfide, sodium mercaptide and disodium sulfide into $H_2S$ methyl mercaptan and sodium sulfate. The reaction mixture is then cooled to about 30° C. in order to facilitate the separation of mercaptan. The crude mercaptan is separated by decantation as previously described and distilled in a high pressure distillation column to recover the methyl mercaptan. About 5200 pounds of pure methyl mercaptan is recovered representing a yield of 84%.

By conducting the above process at about 30° C. and 75 p. s. i. g., for 2 hours, about 4800 pounds of methyl mercaptan is recovered, representing a 77% yield.

EXAMPLE II

In order to further evaluate the process variables of the invention, a series of batch-scale runs were performed in a 300 ml. stainless steel bomb. In these runs the preformed aqueous sodium hydrosulfide solution was poured into the bomb and the desired amounts of liquid methyl chloride and liquid hydrogen sulfide were then added to the solution. The bomb was then closed and heated to the indicated reaction temperatures and continuously rocked during the reaction period. After termination of the reaction, the bomb was vented while still hot, and the products were analyzed. The results for the various runs were as follows:

*Table 1*

| Run No. | Molar Ratios of Reactants | | Max. Temp., °C. | Max. Pressure, p. s. i. g. | Time, Hours | Conversion, Mole Percent Based on $CH_3Cl$ |
|---|---|---|---|---|---|---|
| | $NaSH/CH_3Cl$ | $CH_3Cl/H_2S$ | | | | |
| 1 | 1.2 | 3 | 200 | 650 | 2.5 | 75 |
| 2 | 0.3 | 9 | 100 | 450 | 5 | a 63 |
| 3 | 0.6 | 2 | 150 | 450 | 5 | a, b 48 |
| 4 | 1.2 | 2 | 150 | 550 | 2 | 89 |
| 5 | 1.2 | 2 | 150 | 500 | 0.5 | 93 |
| 6 | 1.2 | 2 | 70 | 225 | 0.5 | 57 |
| 7 | 1.2 | 0.5 | 100 | 550 | 0.5 | 25 |
| 8 | 1.2 | 2.0 | 100 | 310 | 0.5 | 58 |
| 9 | 1.2 | 2.0 | 30 | 150 | 1.0 | 75 | a Based on NaSH.
b NaSH solution was 3 N; 6 N in all other runs.

Run No. 3 above shows the effect of employing dilute sodium hydrosulfide solutions (3 N). The yield is low, and in addition the bomb, after this run, was visibly corroded and an iron-containing sludge was produced. The other runs employing 6 N sodium hydrosulfide produced no visible corrosion over the total elapsed operating time at temperatures between 30° C. and 200° C. Run No. 7 shows the deleterious effects of employing excessive quantities of $H_2S$. Runs 2 and 3 show that when less than one molar equivalent of NaSH is employed, not all the hydrosulfide is converted to mercaptan. Runs 1, 3, 4 and 5 show somewhat higher temperatures and pressures than would preferably be employed in commercial operation utilizing a constant recycle of $H_2S$ and somewhat longer reaction periods. Runs Nos. 6, 8 and 9 approach more nearly the optimum conditions of pressure and temperature for commercial operation; the conversion under these conditions may be increased to 80% or more by continuing the reaction for 1 to 2 hours while constantly recycling $H_2S$.

In runs similar to No. 6 above, but wherein no excess $H_2S$ is employed, the corresponding conversion obtained with a ½ hour run drops off sharply from the indicated 57%. Similarly, if methyl alcohol is substituted for the water in run No. 6, it is found that the conversion after ½ hour is substantially less than that obtained with water. If no solvent is employed the conversion is practically nil. Analogous results are obtained by varying the conditions of the other runs.

While the above description has been directed specifically to the use of sodium hydrosulfide, it is clear that other metal hydrosulfides may also be employed. Specifically any of the alkali metal or alkaline earth metal hydrosulfides may be employed, so long as they are sufficiently soluble in water. Potassium hydrosulfide and calcium hydrosulfide are particularly suitable when used in molar concentrations equivalent to those described for sodium hydrosulfide.

The above description has been restricted to the details of a batch-scale process, but continuous operations are equally suitable. For example, the reaction vessel 1 may be replaced by a heated tubular reactor into which the reactant materials are introduced at the same or different points, and flow concurrently at the same or different linear velocities therethrough until the reaction is essentially complete. The reaction products are then discharged into a gas-liquid separation vessel where the excess $H_2S$ and methyl chloride are removed for recycling, and the liquid products are removed and separated by decantation and distillation in a manner similar to that shown in the drawing. Countercurrent flow processes may also be employed, as for example by flowing the aqueous hydrosulfide solution downwardly through a glass bead packed column and the gaseous $H_2S$ and methyl chloride upwardly therethrough. In both these cases the conditions of temperature, pressure, and molar ratio of reactants may be essentially the same as previously described. However, the aqueous hydrosulfide solution employed should be preferably be somewhat more dilute than those employed in batch processes, for example between about 2 N and 6 N, in order to prevent precipitation of sodium chloride as it is formed. Such continuous flow conversion processes are broadly well known and hence need not be described in detail.

In any of the batch-scale or continuous operations described herein, the reaction may be controlled isothermally, or allowed to proceed adiabatically. Adiabatic operation is generally most economical.

From the foregoing it is clear that the processes disclosed herein provide economical and efficient methods for producing methyl mercaptan from inexpensive raw materials. This description should not however be considered as limiting, since many variations may be made by those skilled in the art without departing from the scope or spirit of the following claims.

We claim:

1. A process for preparing methyl mercaptan which comprises intimately contacting and agitating methyl chloride with a 2 N to 14 N water solution of a metal hydrosulfide, said hydrosulfide being selected from the class consisting of water-soluble alkali metal and alkaline earth metal hydrosulfides, said contacting being carried out in the absence of organic solvents at a temperature between about 10° and 175° C., a pressure between about 0 and 300 p. s. i. g., and in the presence of a gas phase consisting essentially of (1) methyl chloride, (2) produced methyl mercaptan and (3) sufficient excess hydrogen sulfide to maintain a partial pressure thereof between about 0.1 and 0.6 of the total pressure, said gas phase being continuously dispersed and agitated within said metal hydrosulfide solution to thereby maintain said solution in saturated condition with respect to methyl chloride and hydrogen sulfide at the stated partial pressures, continuing said contacting for a period of time which is (1) sufficient to consume substantially all of said metal hydrosulfide, and (2) less than about 2 hours, then terminating the reaction and separating methyl mercaptan from the reaction mixture.

2. A process as defined in claim 1 wherein said metal hydrosulfide is sodium hydrosulfide.

3. A process as defined in claim 1 wherein said metal hydrosulfide is potassium hydrosulfide.

4. A process as defined in claim 1 wherein said metal hydrosulfide is calcium hydrosulfide.

5. A process as defined in claim 2 wherein said contacting temperature is between about 20° and 70° C.

6. A process as defined in claim 2 wherein said contacting is carried out by continuously bubbling gaseous methyl chloride and hydrogen sulfide through a stationary batch of metal hydrosulfide solution having a normality between about 4 and 14.

7. A process as defined in claim 2 wherein said contacting is carried out by continuously flowing a stream of said metal hydrosulfide solution through a tubular reactor, and adding methyl chloride and hydrogen sulfide to said flowing stream, said metal hydrosulfide solution having a normality between about 2 and 6.

8. A process for preparing methyl mercaptan which comprises intimately contacting methyl chloride with a 2 N to about 6 N water solution of an alkali metal hydrosulfide, said contacting being carried out in the absence of organic solvents at a temperature between about 100° and 150° C. under super-atmospheric pressure, and in the presence of a gas phase consisting essentially of (1) methyl chloride, (2) produced methyl mercaptan and (3) sufficient excess hydrogen sulfide to maintain a partial pressure thereof between about 0.1 and 0.6 of the total pressure, said gas phase being continuously dispersed within said metal hydrosulfide solution to thereby maintain said solution in saturated condition with respect to methyl chloride and hydrogen sulfide under the prevailing pressures, continuing said contacting for a period of time which is sufficient to form methyl mercaptan, and separating methyl mercaptan from the reaction mixture.

References Cited in the file of this patent

UNITED STATES PATENTS

| 2,147,400 | Clark et al. | Feb. 14, 1939 |
| 2,404,425 | Beanblossom et al. | July 23, 1946 |
| 2,436,137 | Biswell | Feb. 17, 1948 |

OTHER REFERENCES

Handbook of Chemistry and Physics, 33d. ed. (1951), pages 888–9, 998–9, 1088–9, 1472–3 and 1475. Chemical Rubber Publishing Co. Encyclopedia of Chemical Technology, vol. 8, page 864. Received in The Copyright Office March 13, 1952, Interscience Publishers Inc., N. Y.